United States Patent
Hori et al.

(10) Patent No.: US 6,270,707 B1
(45) Date of Patent: Aug. 7, 2001

(54) MANUFACTURING METHOD OF A HIGHLY CONDUCTIVE POLYTETRAFLUOROETHYLENE SHEET

(75) Inventors: Yoshinori Hori; Toshinori Kadowaki; Hiroyuki Yoshimoto, all of Settsu; Kyohiro Kang, Osaka, all of (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 09/145,284

(22) Filed: Sep. 2, 1998

(30) Foreign Application Priority Data

Sep. 2, 1997 (JP) .................................. 9-236720

(51) Int. Cl.[7] .................. B29C 47/10; B29C 59/04
(52) U.S. Cl. .................. 264/104; 264/118; 264/119; 264/127; 264/146; 264/175; 264/150
(58) Field of Search .................. 264/104, 105, 264/125, 127, 175, 176.1, 209.1, 210.1, 211, 213, 145, 146, 148, 150, 118, 119; 428/421

(56) References Cited

U.S. PATENT DOCUMENTS

| | | | |
|---|---|---|---|
| 3,953,566 | * 4/1976 | Gore | 264/288 |
| 3,962,153 | * 6/1976 | Gore | 264/288 |
| 4,170,540 | * 10/1979 | Lazarz et al. | 264/127 |
| 4,342,636 | * 8/1982 | Chang et al. | 204/296 |
| 4,529,564 | * 7/1985 | Harlow | 264/127 |
| 4,985,296 | * 1/1991 | Mortimer, Jr. | 428/220 |
| 5,312,576 | * 5/1994 | Swei et al. | 264/112 |
| 5,429,869 | * 7/1995 | McGregor et al. | 428/364 |
| 5,814,405 | * 9/1998 | Branca et al. | 264/127 |
| 6,016,848 | * 1/2000 | Egres, Jr. | 138/137 |

* cited by examiner

Primary Examiner—Angela Ortiz
(74) Attorney, Agent, or Firm—Armstrong, Westerman, Hattori, McLeland & Naughton, LLP

(57) ABSTRACT

This invention concerns a method of manufacturing a highly conductive polytetrafluoroethylene sheet; a method of manufacturing a highly conductive unsintered polytetrafluoroethylene sheet: and a method of manufacturing a highly conductive sintered sheet. In the first method, a paste of polytetrafluoroethylene powder admixed with conductive substance and extrusion lubricant is extruded to preform an unsintered tube-like material, and at least one place on the circumference of this extruded material, the material is cut open longitudinally and the resulting sheet is calendered if necessary. The second method includes a sintering process for the sheet. This invention also concerns a highly conductive polytetrafluoroethylene sheet having a wide-width and long-length, which is obtained by the above-mentioned method. This sheet is not less than 170 mm in width and has variance of volume resistivity (conductivity) in the longitudinal direction, 10% or less, preferably 7% or less in the cross direction. This invention can provide a highly conductive wide-type PTFE sheet whose conductivity in the longitudinal direction is nearly uniform in the cross direction.

6 Claims, 4 Drawing Sheets

(A)

(B)

PRIOR ART

MANUFACTURING METHOD OF A HIGHLY CONDUCTIVE POLYTETRAFLUOROETHYLENE SHEET

FIELD OF INDUSTRIAL APPLICATION

This invention relates to a manufacturing method of a highly conductive polytetrafluoroethylene sheet (hereinafter called PTFE sheet) which is suitable for a raw material of sheet-type heating elements and electrodes of primary batteries, secondary batteries and fuel cells, especially highly conductive PTFE sheet which is suitable for a raw material of highly conductive PTFE sheet having a wide-width and a long-length. This invention also relates to a highly conductive PTFE sheet which conductivity in the longitudinal direction is nearly uniform in the cross direction.

PRIOR ART

Such a highly conductive PTFE sheet has been conventionally manufactured by the following method. PTFE prepared by the suspension polymerization method is ground into powder with a particle size of 20–40 µm. This powder is mixed with conductive carbon (5–15 weight percent), The resulting mixture is placed in a certain metal mold for compression preforming at 400–600 kgf/cm². The molded block is sintered at 380° C. for 5–10 hours. Thus obtained block is shaved into thin sheets.

These sheets have volume resistivity of $10^2$–$10^4$ Ω-cm which is low conductive. The surface of this low conductive sheets lack smoothness, because scratches are formed on the surface during the shaving process.

PTFE sheet can be also produced by another method. Aqueous dispersion containing PTFE with a particle size of 0.15–0.35 µm is obtained by the emulsion polymerization method.

A nonionic surface-active agent, water and carbon are kneaded in a ball mill to prepare the conductive paste. The aqueous dispersion and the paste are mixed to prepare a coating material. This coating material is then coated onto a plate. After drying, the plate is sintered at 380° C. for approximately 15 minutes. The coated film separated from the plate can be obtained as a conductive sheet.

The volume resistivity of the sheet produced by this method ranges from approximately $10^0$ Ω-cm to $10^1$ Ω-cm if conductive carbon is added at 8–30weight percent. The volume resistivity depends on the amount of conductive carbon added, but the conductivity of this sheet is riot yet sufficient. And, producing a sheet having a thickness exceeding 60 µm and without crack by this technique is extremely difficult.

Therefore, highly conductive PTFE sheet is conventionally produced by the following method. A paste of PTFE powder admixed with conductive substance and extrusion lubricant is extruded through dies as shown in FIG. 5(a) and FIG. 5(b). These extruded materials are then calendered and sintered to the final products.

According to FIG. 5(a) and FIG. 5(b), said paste 10 is extruded through cylindrical die 1(a) or oval body type die 2(b) into rod-like unsintered extruded material 3 or 4. These extruded materials are calendered.

The highly conductive PTPE sheet having a wide-width and a long-length is obtained by the following method. As shown in FIG. 5(c), the paste is extruded through T die 5. This extruded sheet 6 is calendered. Although the technique is not illustrated in figure, extruded sheet 6 can be also calendered by a multistage calendering roll (d). In FIGS. 5, 11, 12 and 13 show respectively a ram, a fixing ring and a heater.

However, the above-mentioned producing techniques (a) and (b) can provide sheets as commercial products having the maximum width of 160 mm because the width of such obtained products are restricted. When the width of the products are larger, their conductivity in the longitudinal direction decreases and loses uniformity in the cross direction. The conductivity in the longitudinal direction of the above-mentioned techniques (c) and (d) is low and a multistage calendering roll or a roll with large diameter is needed to produce these sheets.

[A roll with large diameter (e.g 500 mmφ) or the like is preferably used to produce PTFE sheets with higher conductivity.] These techniques require complicated and large equipment, thus increasing the cost.

OBJECT OF THE INVENTION

The objects of this invention are to provide highly conductive PTFE sheet which is useful for a raw material of sheet-type beating elements and electrodes of primary batteries, secondary batteries and fuel cells, and to provide a producing method thereof. This highly conductive PTFE sheet requires the following conditions:
(1) Wide width
(2) High conductivity in the longitudinal direction
(3) Conductivity in the longitudinal direction is nearly uniform in the cross direction.

CONSTRUCTION OF THE INVENTION

This invention concerns a method to manufacture highly conductive PTPE sheets. According to this method, A paste of PTFE powder admixed with conductive substance and extrusion lubricant is extruded to prepare an unsintered tube-like material. At least one place on the circumference of this unsintered tube-like extruded material, the material is cut open longitudinally and the resulting sheet is further calendered if necessary. This invention also concerns a method to manufacture highly conductive PTFE sheets by sinterinig the sheets produced by the above-mentioned method.
(These methods are regarded as the invented manufacturing methods.)
These invented manufacturing methods can be applied to the manufacturing of highly conductive PTFE sheets being not less than 170 mm in width and also those being less than 170 mm in width. These invented manufacturing methods can be applied to the manufacturing of highly conductive PTFE sheet having a wide-width and a long-length (the invented sheet) which is not less than 170 mm in width and whose variance of volume resistivity (conductivity) in the longitudinal direction is 10% or less in the cross directions, preferably 7% or less.
(The definition of the variance is described later.)

According to these invented manufacturing methods, at least one place on the circumference of the tube-like extruded material, the material is out open longitudinally to a sheet. This sheet is calendered if necessary so that PTFE particles are sufficiently oriented in the longitudinal direction (on the internal and external surfaces of the extruded material or in the whole extruded material). This orientation is carried out during the calendering process. Therefore, the mixed conductive substances such as conductive carbon are arranged lengthwise in nearly straight lines. This parallel arrangement of conductive substances is indispensable for producing highly conductive PTFE sheet with conductivity in the longitudinal direction is nearly uniform in the cross direction.

The PTFE sheets with following excellent properties of the invention can be obtained with high reproducibility by the invented manufacturing methods. Those with uniform exothermic properties are used for sheet-type heating elements, while those with water repellent properties are used for the electrodes of primary batteries, secondary batteries and fuel cells.

These invented sheets are highly conductive which are not less than 170 mm in width and whose variance of volume resistivity (conductivity) in the longitudinal direction is 10% or less, preferably 7% or less.

PTFE, which is used for a raw material of the invented method and sheet, can be preferably obtained usually from PTFE aqueous dispersion prepared by emulsion polymerization of tetrafluoroethylene (hereinafter called TFE).

PTFE includes not only PTFE itself but also modified PTFE which are modified by PTFE modifying monomers.

PTFE modifying monomers include fluorine-containing unsaturated monomers except for TFE, such as fluoroalkyl vinyl ethers expressed by the following chemical formulas:

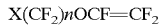

where,
"X" indicates hydrogen, fluorine or chlorine and "n" indicates an integer ranging from 1 to 6,
or,

where,
"m" and "l" are integers ranging from 0 to 4, that are never zero simultaneously.

where,
"Rf" indicates straight or branched polyfluoroalkyl group having 3 to 21 carbon atoms; Y indicates hydrogen or fluorine atoms. Such fluorine-containing unsaturated monomers are generally added in amounts that do not exhibit melt-flow properties. The adequate amount is adjusted depending on the types of modifying monomers. For example, some modifying monomers are added at less than 2 percent by weight, preferably 0.0–1 percent by weight of PTFE.

In order to prepare paste of PTFE powder used in the present invention, PTFE-containing aqueous dispersion obtained by the above-mentioned emulsion polymerization of TFE is mixed with the following substances:
(1) conductive substances mentioned later
or,
(2) these conductive substances and the extrusion lubricants mentioned later.

The mixture is stirred to coagulate. In the second case, the coagulated substance obtained is directly used as paste of PTFE powder (refer to WO95/23178).

In the first case, the coagulated substance obtained is dried, then the dried material can be used for paste of PTFE powder when mixed with the extrusion lubricants.

The conductive substances used in the present invention include conductive carbon, carbon fiber and metal particles. Of these, conductive carbon is most preferable.

The amounts of conductive substances to be added are adjusted depending on the following use. It PTFE sheet is used for sheet-type heating elements, conductive substances are generally added at 15–50 percent by weight of PTFE. If PTFE sheet is used for the above-mentioned batteries, conductive substances can be generally added at more than 50 percent by weight of PTFE.

The extrusion lubricants used in the present invention are white oil, isoper, smoil and naphtha. They are generally added in the amounts ranging 10 to 60 percent by weight of PTFE and conductive substance.

PREFERRED EMBODIMENTS OF THE INVENTION

According to the present invented manufacturing methods, for example, the paste of PTFE powder is molded preparatorily with the compression molding machine shown in FIG. 3(A). A preform 30 is set in the ram extruder shown in FIG. 2. By extrusion molding of the preform 30 an unsintered PTFE tube-like extruded material 32 is obtained.

A ram extruder 31 which can be used for the present invented manufacturing methods is shown in FIG. 2. It consists of a cylinder 20, a mandrel 21, a die 22, a tapered part 23 and a pressure ram 24. The mandrel 21 is set in the center of the cylinder 20. The die 22 having a tapered part 28 is fixed which is set at the taper 25 side of the mandrel 21 in the cylinder 20. The passage for the preform 30 tapers off to an outlet 26. The ram 24 is set on the opposite side of the tapered part 23.

Although the above-mentioned extrusion pressure ranges from approximately 70 to 300 kgf/cm$^2$, the pressure is adjusted to the level according to the reduction ratio (hereinafter called R.R.), which is the ratio between the cross section (R) of the cylinder 20 of the extruder 31 and the cross section (R') at the exit of the die 22. Generally, this ratio is adjusted to 10–200 and the extruding pressure rises when R.R. increases.

If conductive carbon is used as the conductive substance in the extrusion process, it is supposed that as shown in FIG. 4, all the parts of the material to be extruded is easily oriented so that PTFE particles are stretched lengthwise and the carbon structure is oriented.

Preform 30 which is obtained from the paste of PTFE powder can be set in the extruder 31 by the following method. As shown in FIG. 3(A) and FIG. 3(B), the preform 30 is obtained by pressing with a pressure ram 34 from the opposite side of a cap 29 inside a cylinder 28 with a mandrel 27 in the center. This preform 30 can be inserted into the cylinder 28.

This preforming is usually carried out so that the material to be excluded can be easily inserted into the cylinder. The preferable pressure for preforming ranges from 10 to 50 kgf/cm$^2$.

The unsintered tube-like material 32 is extruded from the extruder 31.

One or more places (in this case, one place on the circumference of this extruded material) are cut open with a cutter 33 etc. in the longitudinal direction to prepare a sheet, as shown in FIG. 1. This sheet can be set between a calendering roll 47 and a calendering roll 48 for rolling if necessary.

A highly conductive sheet 35 having a wide-width can be obtained by this rolling process.

The number of out made at the unsintered extruded tube-like material determine the number of sheet to be developed:
(1) One sheet is developed by one cut.
(2) Two sheets are developed by two cuts.
(3) More than three sheets are developed by three cuts or more, In this case, the above case (1) is mainly explained.

In the remaining two cases, (2) and (3), however, highly conductive sheets for a target can be obtained in a similar manner.

For example, in case (1), a cut is made with a cutter on the circumference of the unsintered tube-like material to develop a sheet. This sheet is reeled up as a material for the invented highly conductive PTFE sheet. This sheet is soaked in hot water at, for example, 80° C. for heating and set in the roll if necessary. In the present invention, it is preferable that the sheet be extended by the calendering roll in the longitudinal direction by 1 to 10 times while it is extended in the cross direction by 1 to 3 times.

In the present invention, the thickness of the extruded sheet material generally ranges from 0.3 mm to 5 mm. This unsintered tube-like material is cut open and the developed sheet is calendered and extended longitudinally by 1 to 10 times and transversely by 1 to 3 times if necessary. This sheet is generally inserted between a couple of calendering rolls rotatable each other. In order to roll the sheet easily, these calendering rolls are heated to a temperature ranging from room temperature to 100° C.

The thickness of the calendered sheet is preferably from approximately 0.05 mm to 2 mm. The calendering process can be carried out one time or more.

The rolled sheet is then heated from 100 to 260° C. by the ordinary method to remove the extrusion lubricant and unsintered sheet is obtained. The resultant sheet has a high elasticity.

Accordingly a wide and long sheet of polytetrafluoroethylene which has high conductivity in the longitudinal direction and nearly uniform conductivity in the cross direction is obtained. Although the volume resistivity of this sheet in the longitudinal direction generally ranges from $10^{-3}$ $\Omega$-cm to $10^5$ $\Omega$-cm, preferably its volume resistivity should be adjusted to the level from $10^{-3}$ $\Omega$-cm to $10^0$ $\Omega$-cm.

In order to enhance the mechanical strength and the conductivity of the PTFE sheet, the sheet is sintered at a temperature of from the melting point (327° C.) of PTFE to its decomposition temperature (400° C.) for 1 to 30 minutes.

The highly conductive sheet produced by the present invented methods is not less than 170 mm in width and has volume resistivity (conductivity) ranging from $10^{-3}$ $\Omega$-cm to $10^5$ $\Omega$-cm in the longitudinal direction, preferably ranging from $10^{-3}$ $\Omega$-cm to $10^0$ $\Omega$-cm, and its variance of volume resistivity (conductivity) in the longitudinal direction is 10% or less, preferably 7% or less in the cross direction.

This highly conductive wide-type PTFE sheet shows remarkable uniformity in the cross direction of conductivity in the longitudinal direction. Because of its excellent property, this highly conductive PTFE sheet can be practically applied to various fields as a sheet-type heating element. Moreover, this highly conductive PTFE sheet is a useful material for the electrodes of primary batteries, secondary batteries and fuel cells. Consequently, this highly conductive PTFE sheet is useful for industry.

This producing technique of the invention requires only simple and small equipment (a calendering roll with small-diameter is available), which reduces the cost because of the compactness of the equipment. Beside these advantages, this highly conductive PTFE sheet has the following excellent properties. Although the edges of sheets produced by conventional methods easily become wavy, be cracked and serrated, this new sheet suffers virtually none of these defects. The edge of this new sheet forms an almost straight line and the loss of the sheet is decreased, which significantly improves the yield of the sheet.

Figure 1:
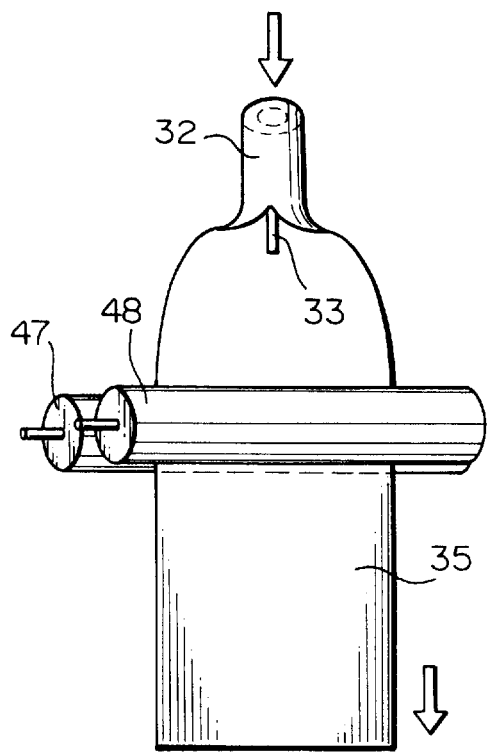
FIG. 1: An oblique sketch) (A) of the processes of cutting and calendering of the tube-like extruded material prepared by this invented method and a sectional view (B).
Figure 1:
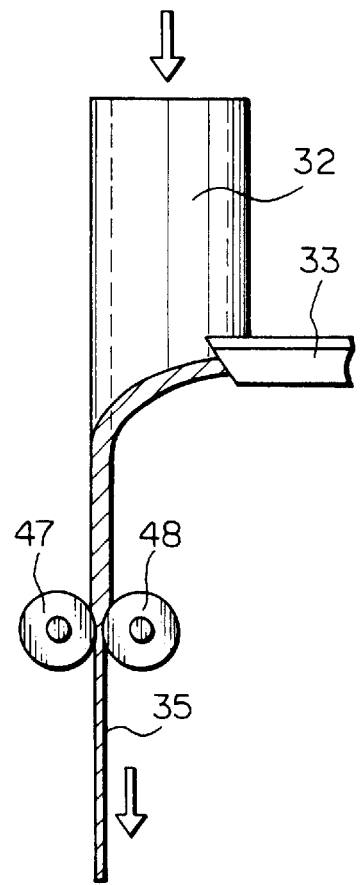

The numbers used in the figures correspond to the following functional parts.

1,2,5,31: extruder (mold or die)
3,4,6,32: unsintered extruded material
10,80: preform
11,24: extruding ram
13: heater
20,28: cylinder
21: mandrel (used for extrusion)
22: die
28,25: taper
27: mandrel (used for preforming)
33: cutter (knife)
84: preforming pressure ram
35: conductive sheet
47,48: calendering roll

EXAMPLES

This invented method will be explained in more detail with reference to the following examples.

Examples 1 to 4

PTFE fine powder containing conductive carbon powder (HS500, Asahi Carbon Co., Ltd.) (25 weight percent) was mixed with white oil (35 weight percent) as a extrusion lubricant. Pressure (50 kgf/cm$^2$) was applied to the resulting mixture for preforming.

Figure 2:
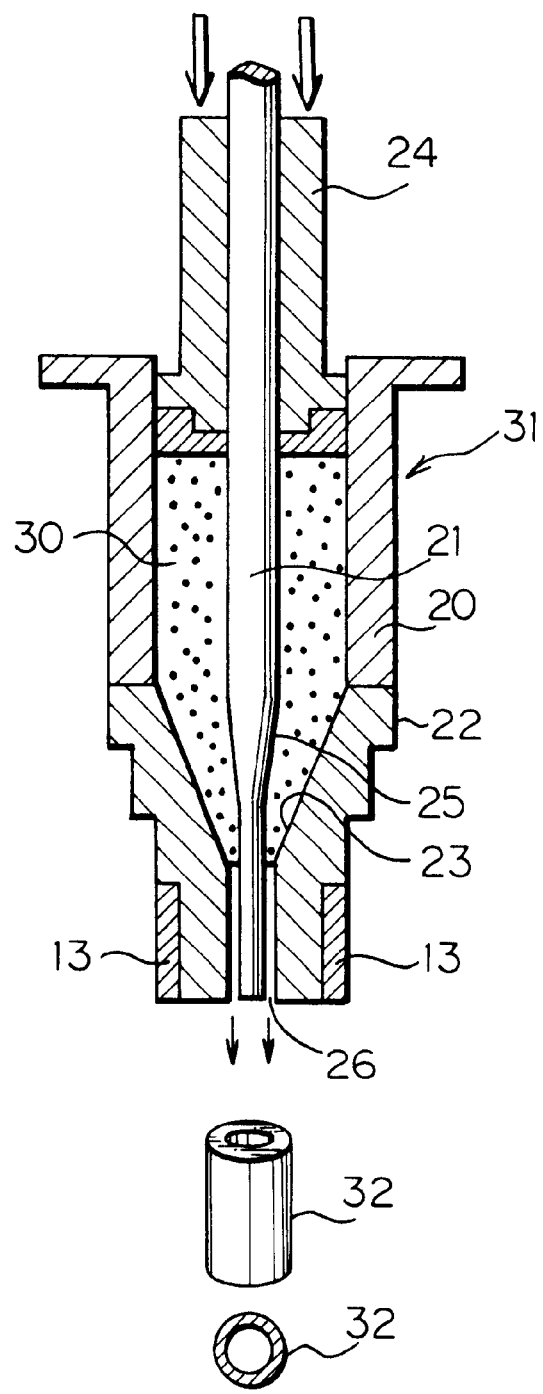
FIG. 2: A cross sectional view showing the extruder to be used for extruding, in a tube form, the preform of a paste of PTFE powder prepared by this invented method and an oblique sketch and a sectional view of the unsintered tube-like material.
Figure 3:
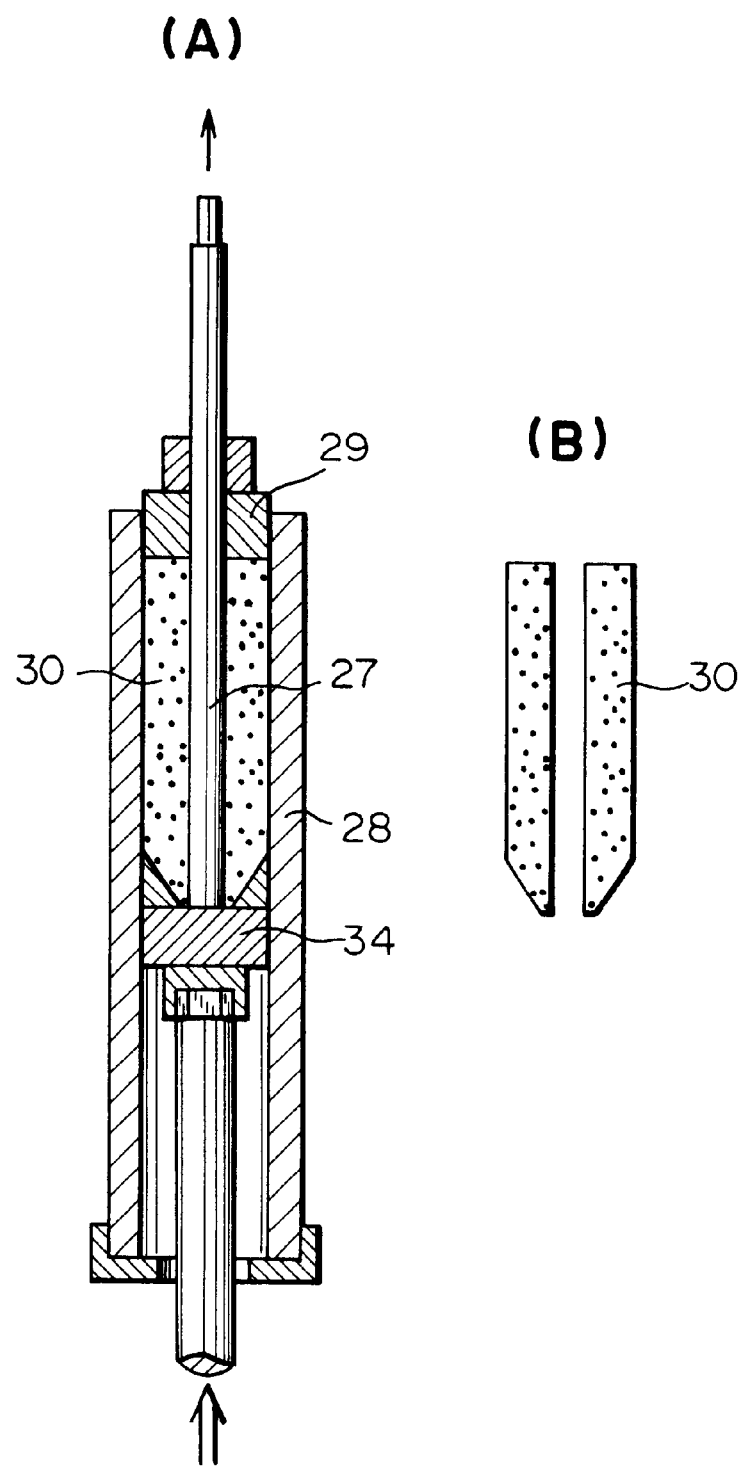
FIG. 3: A sectional view of the preforming machine to be used for preparing the preform to be inserted into the extruder (A) and an oblique sketch of the preform (B).
Figure 4:
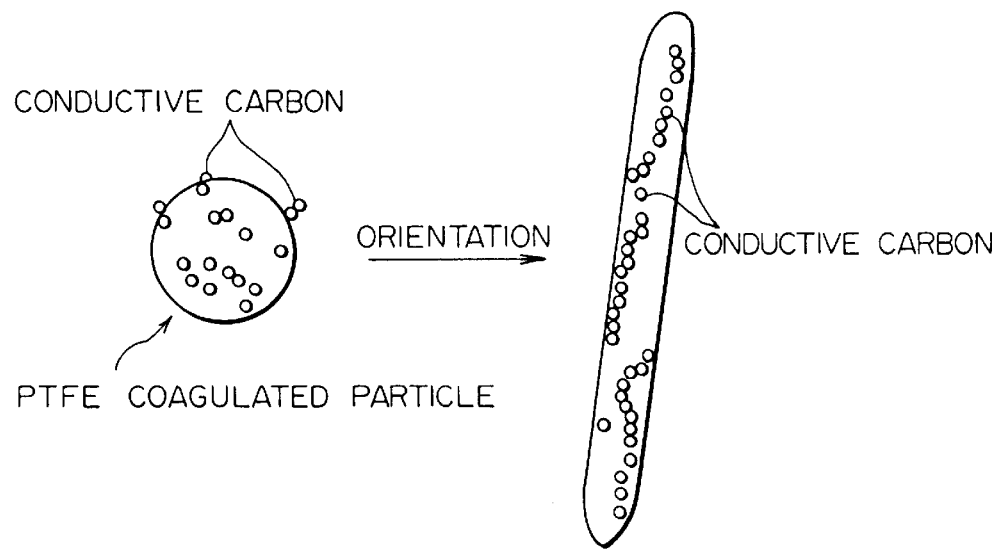
FIG. 4: A schematic sketch showing the orientation of PTFE particle in the surface of the extruded material.

Under the following conditions, the preformed materials were extruded by the extruder shown in FIG. 2.

Internal diameter of the cylinder 20: 76 mm (Examples 1, 3, 4); 102 mm (Example 2)

Diameter of the mandrel 21: 30 mm

Die outlet diameter: External diameter 21.5 mm, Internal diameter 20.1 mm (Example 1)
External diameter 100 mm, Internal diameter 99 mm (Example 2)
External diameter 45 mm, Internal diameter 43.8 mm (Example 3)
External diameter 45 mm, Internal diameter 43.9 mm (Example 4)

In these cases, the extruding part of the extruder was heated to 50–80° C. and the material was extruded to a tube-like form under the pressure of 70–150 kgf/cm$^2$$_1$. Then a cut was carried out on the circumference of the tube-like material with a cutter and the material was cut open to a sheet.

The sheet was caledered through a calendering roll with 500 mm diameter at 60° C. into a 120 $\mu$m thick sheet. The lubricant was removed at 160–260° C. As tensile force was then applied in the rolling direction, the sheet was sintered in a furnace at 380° C. for 2 minutes.

Under various extruding and calendering conditions, the volume resistivity of the resulting sheet of each example was measured and the shates of the each sheet were carefully observed. The results are summarized in Table 1.

In order to determine the volume resistivity, an AC voltage was applied and the electric current and size of the each sheet were measured. A test sample of highly conductive PTFE sheet (width: 10 mm, longitudinal length: 220 mm) was prepared by cutting the resulting sheet. In this case, only in Example 1 the sheet was cut from the end of the width into 9 test samples of 10 mm width spaced at intervals of 0.625 mm along the cross direction. Two copper foil electrodes of 10 mm width were pressed against the either end of the each test sample and an AC voltage was applied to the copper foil electrodes to measure the electric current.

The value of the volume resistivity of the each test sample was measured by the following method. That is, the values of the measured voltage and electric current were substituted in the following formula to determine the resistance between either electrode:

$$\text{Resistance } (\Omega) = \frac{\text{Measured voltage } (V)}{\text{Measured electric current } (A)}$$

The volume resistivity was determined by the following formula:

$$\text{Volume resistivity } (\Omega - cm) = \frac{\text{Resistance } (\Omega) \times \text{Thickness of sheet (cm)} \times \text{Width of sheet (cm)}}{\text{Distance between either electrode (cm)}}$$

The variance in the cross direction of volume resistivity in the longitudinal direction was calculated by the following formula through substitution of the maximum and minimum values of the determined volume resistivity:

$$\frac{\text{variance in the cross direction of}}{\text{volume resistivity in the longitudinal direction}} = [(\text{maximum value of } determined \text{ volume esistivity} - \text{minimum value of determined volume resistivity})/\text{maximum value of determined volume resistivity}] \times 100(\%) = (B/A) \times 100\,(\%)$$

Comparative Examples 1, 2

Figure 5:
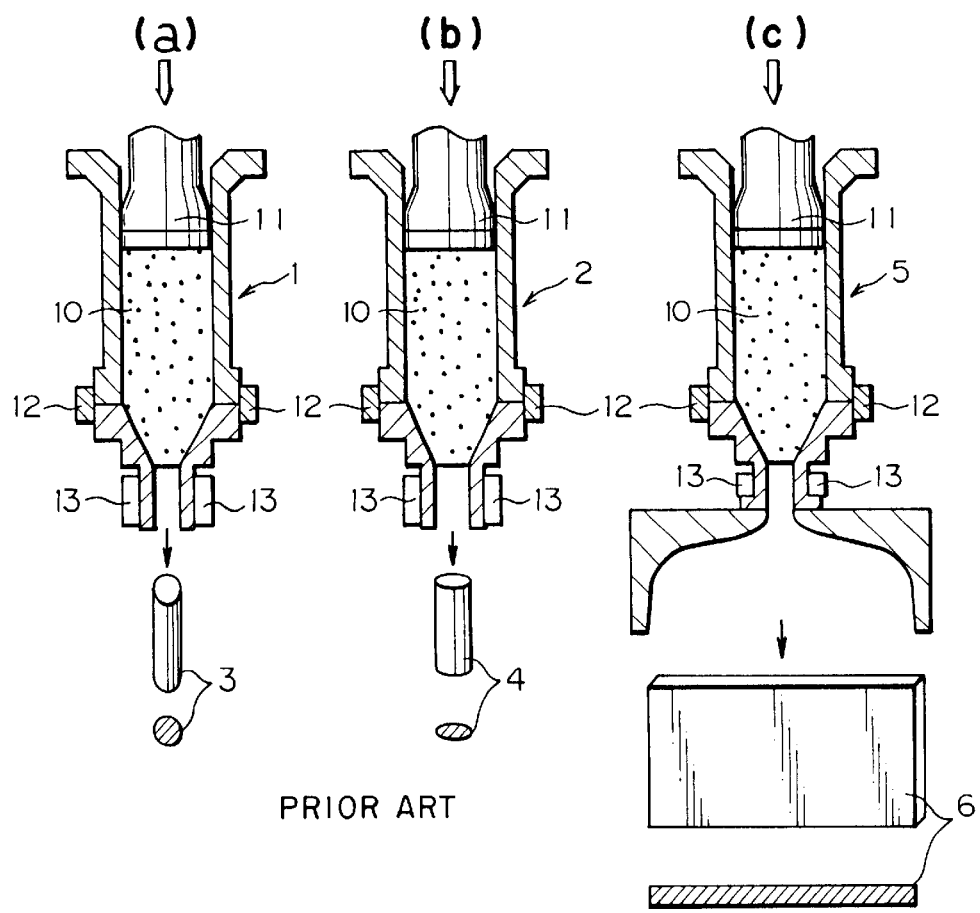
FIG. 5: Oblique sketches and sectional views of various types of conventional dies and extruded materials.

PTFE fine powder containing conductive carbon powder (HS500, Asahi Carbon Co., Ltd.) (25 weight percent) was mixed with white oil (85 weight percent). Pressure (50 kgf/cm$^2$) was applied to the mixture for preforming. This preformed material was inserted into the extruder shown in FIG. 5(a) with a cylinder of 130 mm in diameter and a dice outlet of 18 mm in diameter. Under the pressure of approximately 73 kgf/cm$^2$, the material was extruded in a rod-like form.

This material was rolled through a calendering roll having 500 mm diameter at 60° C. into a sheet of 150 μm thickness. As tensile force was applied in the cross and longitudinal directions, the sheet was sintered in a oven at 380° C. for 2 minutes.

Under various extruding and rolling conditions, the volume resistivity was measured and the states of sheets were carefully observed, The results are summarized in Table 1.

TABLE 1-1

| | | Raw material and Extruding condition | Appearance of extruded material | Calendering | | Sintering condition | |
|---|---|---|---|---|---|---|---|
| | | | | Longitudinal direction | Cross direction | Temperature (° C.) | Time (minute) |
| Example | | | | | | | |
| | 1 | PTFE 75 wt % Carbon 25 wt % R.R. = 83 | Tube: Diameter of Tube φ 21.5 mm Thickness of tube wall: 0.7 mm | 4 times | 1.4 times | 360 | 2 |
| | 2 | PTFE 75 wt % Carbon 25 wt % R.R. = 48 | Tube: Diameter of Tube φ 100 mm Thickness of tube wall: 0.5 mm | 4 times | 1.3 times | 360 | 2 |
| | 3 | PTFE 75 wt % Carbon 25 wt % R.R. = 46 | Tube: Diameter of Tube φ 45 mm Thickness of tube wall: 0.6 mm | 4 times | 1.4 times | 360 | 2 |
| | 4 | PTFE 75 wt % Carbon 25 wt % R.R. = 50 | Tube: Diameter of Tube φ 45 mm Thickness of tube wall: 0.55 mm | 4 times | 1.3 times | 360 | 2 |

TABLE 1-1-continued

|  | Raw material and Extruding condition | Appearance of extruded material | Calendering | | Sintering condition | |
|---|---|---|---|---|---|---|
|  |  |  | Longitudinal direction | Cross direction | Temperature (° C.) | Time (minute) |
| Comparative Example |  |  |  |  |  |  |
| 1 | PTFE 75 wt % Carbon 25 wt % R.R. = 52 | Rod: Diameter of Rod φ 18 mm | 4 times | 11 times | 360 | 2 |
| 2 | PTFE 75 wt % Carbon 25 wt % R.R. = 52 | Rod: Diameter of Rod φ 18 mm | 3.8 times | 12 times | 360 | 2 |

TABLE 1-2

|  | State of Sheet after sintering | | | conductivity in the longitudinal direction: Volume resistivity ($\times 10^{-1}$ Ω - cm) | variance in the cross direction of volume resistivity in the longitudinal direction (%) | Remarks |
|---|---|---|---|---|---|---|
|  | Thickness (μm) | Tensile strength (kg/cm²) | Width (mm) |  |  |  |
| Example |  |  |  |  |  |  |
| 1 | 110 | Longitudinal direction/Cross direction = 285/140 | 95 | 2.90 | 5 |  |
| 2 | 85 | Longitudinal direction/Cross direction = 290/145 | 400 | 2.85 | 5 |  |
| 3 | 100 | Longitudinal direction/Cross direction = 290/143 | 200 | 2.95 | 5 |  |
| 4 | 140 | Longitudinal direction/Cross direction = 287/142 | 170 | 2.90 | 5 |  |
| Comparative Example |  |  |  |  |  |  |
| 1 | 140 | Longitudinal direction/Cross direction = 250/165 | 170 | 3.30 | 20 |  |
| 2 | 120 | Longitudinal direction/Cross direction = 250/166 | 200 | 3.30 | 23 | Wavy edges were observed in appearance |

These experimental results demonstrate that the highly conductive PTFE sheet of the invention is sufficiently wide and has nearly uniformity in the cross direction of conductivity in the logitudinal direction, and that the invented sheet is clearly better than the wide-type sheets produced by the conventional methods.

According to this invented method, a paste of PTFE powder is extruded in a tube-like form. At least one place on the circumference of the extruded tube-like material, the material is cut open longitudinally and the resulting sheet calendered if necessary. In this way, a wide-type sheet with uniformity in the cross direction of conductivity in the longitudinal direction can be obtained.

By this invented method, wide-type PTFE sheets with uniformity in the cross direction of conductivity in the longitudinal direction are produced with high reproducibility. Therefore, these PPFE sheets can be used as a raw material for sheet-type heating elements because of their uniform exothermic properties, while they can be used as a raw material for electrodes of primary batteries, secondary batteries and fuel cells because of their water repellent properties.

The invented sheets are not less than 170 mm in width and have excellent conductivity (variance in the cross direction of volume resistivity in the longitudinal direction should be 10% or less, preferably 7% or less).

The invented manufacturing method requires only simple and small equipment (a calendering roll with small-diameter is available), thus reducing the cost because of the compactness of the equipment. Beside these advantages, this highly conductive PTFE sheet has the following excellent properties. Although the edges of the sheets produced by conventional method easily become wavy, be cracked and serrated, this new sheet suffers none of these defects. The edge of this new sheet forms an almost straight line and the loss of the sheet is decreased, which significantly improves the yield of the sheet.

What is claimed is:

1. A manufacturing method of a highly conductive polytetrafluoroethylene sheet, said method comprising the steps of:

admixing a paste of polytetrafluoroethylene powder with conductive substance, being 15–50 wt. % of the PTFE, and extrusion lubricant, being 10 to 60 wt. % of PTFE;

extruding the admixture into a preform unsintered tube material by a RAM extruder using an extrusion pressure of 70 to 300 Kgf/cm$^2$ to a thickness of 0.3 to 5 mm, cutting longitudinally at least one place on a circumference of the unsintered tube material, and calendering the resulting sheet wherein said highly conductive polytetrafluoroethylene sheet is not less than 170 mm in width and the variance of volume resistivity in the longitudinal direction is 10% or less.

2. A manufacturing method as defined in claim 1 further comprising the step of sintering the highly conductive polytetrafluoroethylene sheet.

3. A manufacturing method as defined in claim 1 or 2 wherein the unsintered tube extruded material has an orientation of polytetrafluoroethylene particles, at least in the internal and external surface layers, in the longitudinal direction.

4. A manufacturing method as defined in claim 1 or 2 wherein the unsintered tube extruded material has an orientation of polytetrafluoroethylene particles in the longitudinal direction.

5. A manufacturing method as defined in claim 1 or 2 wherein the sheet is extended by calendering in the longitudinal direction 1 to 10 times.

6. A manufacturing method as defined in claim 1 or 2 wherein the sheet is extended by calendering along the width 1 to 3 times.

* * * * *